3,600,323
Patented Aug. 17, 1971

3,600,323
METHOD FOR PREPARING STABLE URANIA-PLUTONIA SOLS
Othar K. Tallent, Oak Ridge, Tenn., assignor to the United States of America as represented by the United States Atomic Energy Commission
No Drawing. Filed Oct. 6, 1969, Ser. No. 864,154
Int. Cl. C09k 3/00
U.S. Cl. 252—301.1S          8 Claims

ABSTRACT OF THE DISCLOSURE

A method for preparing stable urania-plutonia sols which exhibit minimal oxidation-reduction between the tetravalent ionic species is provided by preparing a nitrate-stabilized polymeric tetravalent plutonium sol by alcohol extraction of a plutonium nitrate solution, mixing the tetravalent plutonium sol with a crystalline, nitrate-stabilized, tetravalent uranium sol and thereafter removing nitrate by solvent extraction.

BACKGROUND OF THE INVENTION

This invention relates generally to sol-gel processes for preparing nuclear fuels and more particularly to a method for preparing stable urania-plutonia sols which exhibit minimal oxidation-reduction between the tetravalent species. The invention described herein was made in the course of, or under, a contract with the United States Atomic Energy Commission.

In my copending application, Ser. No. 864,155, filed of even date, there was disclosed and claimed a method for preparing urania-plutonia sols which were compatible. Nitrate-stabilized tetravalent uranium and plutonium sols were codigested at a temperature between 80°–100° C. to promote colloidal association of the uranium and plutonium as a solid solution and release of nitrate to the aqueous phase. Thereafter, the nitrate was removed to a desired level suitable for microsphere formation. While this method was quite successful in preparing urania-plutonia sols which exhibited minimal oxidation-reduction between the tetravalent species and which could thus be processed into excellent high density product microspheres, it was necessary to employ an elevated temperature digestion step to achieve the requisite compatibility of the mixed urania-plutonia sols. It is desirable and an object of this invention to provide a method for preparing stable urania-plutonia sols having minimal oxidation-reduction between the tetravalent species without having to go through a tedious, time consuming, high temperature digestion step.

SUMMARY OF THE INVENTION

This object is realized by the discovery that a nitrate-stabilized polymeric tetravalent plutonium sol which was formed by alcohol extraction of a plutonium nitrate solution could be mixed with a crystalline, nitrate-stabilized uranium (IV) sol to form, after removal of released nitrate, a stable compatible urania-plutonia sol which exhibited minimal oxidation- reduction between the tetravalent ionic species and which was formed into crack-free microspheres upon calcination. In one embodiment a dilute (0.13 M) plutonium nitrate-(0.12 M) nitric acid solution is contacted with n-hexanol and the nitrate extracted until the nitrate/plutonium mole ratio is about 3. The resulting solution is then converted to a sol by heating to about 100° C., cooling, and re-extracting with n-hexanol until a nitrate/plutonium mole ratio is about 1.0. The mixed urania-plutonia sol had exceptional stability, i.e., a shelf-life of about 12 hours vs. a shelf-life of <1 minute for sols extracted with amine without elevated temperature digestion and was readily formed into excellent dense urania-plutonia microspheres which were crack-free, had high density, and had good crushing strengths.

DESCRIPTION OF THE PREFERRED EMBODIMENTS

The nitrate-stabilized polymeric plutonium (IV) sol is prepared by extracting nitrate from a tetravalent plutonium nitrate solution with an immiscible aliphatic alcohol. Suitable alcohol extractants are n-butanol, n-hexanol, and 2-ethyl-1-hexanol. It is preferred that the extraction be effected from a dilute plutonium-containing nitrate solution, such as a 0.1–0.25 M plutonium nitrate-0.3–0.8 M nitric acid solution.

With regard to plutonium sol formation, spectrophotometric and distribution coefficient data has shown that the chemical mechanisms are quite complex and include plutonium disproportionation, recombination of plutonium III and VI, hydrolysis, and polymerization. During the initial extraction, tetravalent plutonium in the dilute feed solution largely disproportionates to the trivalent and hexavalent forms as nitric acid is extracted according to the following equation:

$$3Pu^{+4} + 2H_2O \rightleftharpoons 2Pu^{+3} + PuO_2^{+2} + 4H^+ \qquad (1)$$

Due to disproportionation and decreased tetravalent plutonium concentration, an unusually large amount of nitric acid can be extracted before the tetravalent plutonium hydrolyzes and polymerization occurs. Tetravalent plutonium hydrolyzes in accordance with the following equation:

$$Pu^{+4} + H_2O \rightleftharpoons Pu(OH)^{+3} + H^+ \qquad (2)$$

The nitrate extraction may be effected in two stages. In the first, nitrate is removed until a nitrate/plutonium mole ratio is about 2–3. The resulting solution can be converted to a plutonia sol by heating to about 100° C., cooled, and re-extracted until a nitrate/plutonium mole ratio is between 0.3–1.0. The nitrate can also be extracted in a single operation; but longer operating times are required, because of a very slow release of nitrate at ambient temperatures. During the initial digestion at 100° C., hydrolysis of the tetravalent plutonium occurs and causes recombination of the trivalent and hexavalent to the tetravalent form, continued hydrolysis of tetravalent plutonium and subsequent polymerization. Significantly, the plutonium hydrolysis and polymerization occur in low acid media under relatively constant conditions which are conducive to formation of highly crystalline polymer.

In the initial stage of the alcohol extraction both plutonium and total nitrate extraction coefficients decrease as the nitrate/plutonium mole ratio of the system decreases, while after heating, which promotes hydrolysis and polymerization, the plutonium extraction coefficient decreases substantially and the nitrate extraction coefficient increases. This is shown in the table below.

TABLE.—PLUTONIUM AND NITRATE EXTRACTION COEFFICIENTS FOR AN AQUEOUS N-HEXANOL SYSTEM
[Feed: 0.14 M Pu(NO₃)₄, 1.0 N HNO₃]

| Extraction Number | Mole ratio, NO₃⁻/Pu | Extraction coefficient Plutonium E,A. | Nitrate, E,A. |
|---|---|---|---|
| 1 | 6.10 | 0.0037 | 0.067 |
| 2 | 4.47 | 0.0029 | 0.042 |
| 3 | 3.94 | 0.0024 | 0.041 |
| 4 | 2.98 | 0.0017 | 0.044 |
| 5 | 2.85 | 0.0014 | 0.029 |
| 6' | 2.02 | 0.0003 | 0.057 |
| 7' | 1.40 | 0.0001 | 0.67 |

¹ Solutions heated between extractions.

The nitrate extraction behavior indicates that nitric acid is the primary extracted species and that nitric acid extraction coefficients are nearly constant with varying acid concentrations. The decrease in plutonium coefficients appears to primarily reflect the extent of hydrolysis which occurs, since extraction coefficients for polymer were determined to be a factor of 10 lower than for ionic plutonium species. Extraction coefficients for trivalent, tetravalent, and hexavalent plutonium are of the same order ($1-5 \times 10^3$), although the coefficients for hexavalent form are typically 20–30% higher than for the tetravalent plutonium coefficients.

The nitrate and plutonium extraction coefficients increase with increasing solubility of water in the alcohol. The order of extraction of the preferred alcohols is therefore n-butanol>n-hexanol>2-ethyl-1-hexanol. In the n-hexanol system, plutonium extraction coefficients increase with very little increase in nitrate extraction coefficients as the plutonium feed concentration is increased at a constant nitrate/plutonium mole ratio. While this effect would appear to limit the plutonium feed concentrations to dilute solutions (0.1 to 0.2 M) without incurring excess plutonium recycle, it is believed that this behavior varies with the alcohol extractant and that higher plutonium concentrations may be used with 2-ethyl-1-hexanol.

The crystalline, nitrate-stabilized, uranium (IV) sol is prepared by solvent extraction techniques, such as the method disclosed in S.N. 814,311, filed on Apr. 8, 1969, in the names of John P. McBride et al. for "Production of Predominantly Crystalline Sols." In such a method a nitrate-stabilized tetravalent uranium sol is prepared from an acid-deficient solution of uranous nitrate by heating the solution to a crystallizing temperature of between 58°–65° C. and removing nitrate ions at that point with an organic amine at a rate which approximates the rate of release of free acid to the aqueous phase of the resultant sol. This amine extraction which works quite well in the preparation of suitable urania sols should not be confused with the earlier statment that amine extraction would not provide a plutonia sol which would be compatible and form a stable mixed urania-plutonia sol after nitrate removal upon mixing. It will be noted here that applicant's alcohol extraction may also be used as an alternate method for preparing highly crystalline urania sols and is preferred. With the alcohol extraction there are certain distinct advantages realized over the previously used amine extraction. In consideration of phase separation, third-phase formation, and the formation of emulsions, alcohol extraction is superior. Also, less impurities remain in the alcohol extracted sol, probably as a result of the lesser reactivity of the alcohol extractant. More importantly, it has been found that the alcohol extracted plutonia sols are more crystalline and have larger crystallite sizes than with corresponding amine extracted plutonia sols.

After preparing the respective tetravalent uranium and plutonium sols, the two sols are mixed and the resulting mixed sol extracted with a 0.2 M Amberlite LA-2 (n-lauryltrialkylmethyl amine) in n-paraffin to remove the nitrate to a desired concentration for further processing. It should be noted here that with the alcohol extraction the nitrate concentration in the individually prepared sols can be reduced to a sufficiently low level to eliminate the final nitrate extraction step in sols where the plutonium concentration does not exceed about 20 percent. Suitable nitrate/uranium+plutonium mole ratios for successful microsphere preparation is within the range of .08 to 0.22. It should be emphasized here that the alcohol extracted plutonia sol of the present invention, unlike the plutonia sol formed by amine extraction, is completely compatible with a crystalline, nitrate-stabilized uranium (IV) sol and the requisite colloidal association of the plutonium with the urania crystallites is achieved by merely mixing the two sols together.

The mixed urania-plutonia sols prepared by the method of this invention are quite stable (little or no solids settling out) and do not exhibit any thixotropic behavior, all of these properties being deemed quite indicative of the complete compatibility of these sols with minimal oxidation-reduction between the tetravalent species. The shelf-life (i.e., time required for onset of thixotropic gelling) of these sols was about 12 hours compared with ~2 minutes for urania-plutonia sols prepared by amine extraction. Where any formate is present, such as might be in a uranium-containing sol, the shelf-life of the mixed alcohol extracted sols may be increased to greater than 3 days by extraction of the formate prior to mixing. The shelf-life of the mixed sols may also be extended by cooling the mixed sols below room temperature.

Applicant, wishing to not be bound by any rigid theory, believes that the achievement of compatibility between these urania and plutonia sols is attributed to the higher degree of crystallinity and larger crystallite sizes produced in the alcohol extracted plutonium (IV) sols. While other solvent extraction processes, e.g., amine extraction, are capable of providing a plutonia sol suitable for making into calcined microspheres, they do not achieve these critical properties of the alcohol extracted plutonia sols since the previously prepared plutonia sols could not be mixed directly with a crystalline urania sol and achieve colloidal association of the plutonium solids as a solid solution with the urania crystallites. This required a high temperature digestion step.

While the exact crystallite size of the plutonium solids in the polymeric sol has not been finally determined, it is believed that the crystallite size of the alcohol extracted plutonium solids is within the range 5 to 15 angstroms (based on electron microscopy). The urania crystallite sizes for crystalline nitrate-stabilized uranium (IV) sols are between 35 to 100 angstroms. Crystallite sizes of the mixed urania-plutonia sols of this invention are about 40 angstrons.

The urania-plutonia sol may readily be formed into microspheres by dispersing the mixed sol into a column containing 2-ethyl-1-hexanol and congealing the dispersed droplets into gel microspheres. Thereafter the gel microspheres may be calcined into dense urania-plutonia microspheres by heating to about 1200° C. in argon-4% hydrogen. Description of such a sphere-forming process is disclosed in U.S. Pat. 3,290,122 issued on Dec. 6, 1966 to S. D. Clinton et al. for "Process For Preparing Oxide Gel Microspheres From Sols."

The following examples are given to illustrate the invention more fully.

EXAMPLE I

A 0.2 uranium (IV) sol was prepared by continuous alcohol (1500 ml. n-hexanol) extraction of 250 ml. of 0.2 M uranous nitrate solution with heating to 95° C. after the nitrate/uranium mole ratio had been reduced to 1. The final uranium (IV) sol had a nitrate/uranium mole ratio of 0.2 and an average crystallite size, as measured by X-ray line broadening, of 80 angstroms. This sol was concentrated to 1 M by extracting water from it into 600 ml. n-butanol.

A plutonium (IV) sol (0.13 M plutonium, 0.12 M nitrate) was prepared by batch extracting 100 ml. of 0.1 M plutonium nitrate solution with 700 ml. n-butanol. After the nitrate/plutonium mole ratio reached 2.8 the plutonium solution-sol was digested for 30 minutes at 100° C. to increase the rate of polymerization and nitrate extraction. The plutonium (IV) sol was concentrated to 1.0 M plutonium, 0.7 M nitrate by evaporation at 100° C. for 1 hour and had a crystallite size of about 15 angstroms as measured by X-ray line broadening.

Nine (9) ml. of alcohol extracted uranium (IV) sol was mixed with 3 ml. of the alcohol extracted plutonium (IV) sol and the mixture extracted with 130 ml. of water-saturated n-hexanol to remove excess nitrate, the final nitrate/uranium+plutonium mole ratio being 0.18. The resulting mixed sol which was stable for at least 24 hours was formed into microspheres by dispersing the sol into droplets in a column containing 2-ethyl-1-hexanol, congealing the droplets and thereafter calcining the gel microspheres at 1150° C. for 8 hours under argon-4% hydrogen. The product microspheres were black, shiny, approximately 90% crack-free, with a 609-gram average crush strength per 300-micron microspheres.

EXAMPLE II

A high nitrate plutonium (IV) sol (nitrate/plutonium≅1) was prepared as follows: 100 ml. of 0.116 M $Pu(NO_3)_4$-0.9 M $HNO_3$ solution was contacted with 800 ml. n-hexanol and the nitrate extracted until the nitrate/plutonium mole ratio was about 3. The solution was then heated for 0.5 hour to 100° C. to finish converting the solution to a plutonium (IV) sol. The sol was next cooled to room temperature, and re-extracted with 800 ml. of n-hexanol until the nitrate/plutonium mole ratio was about 1.0. The sol was concentrated by evaporation at 100° C. to 0.92 M plutonium (10 ml.).

A 0.98 M crystalline nitrate-stabilized uranium (IV) sol (0.088 M nitrate, 0.47 M formate) was prepared by the general method described in the hereinbefore cited McBride application S.N. 814,311. Fifteen (15) ml. of the uranium (IV) sol was mixed with 4 ml. of the plutonium (IV) sol and the resulting mixed sol contacted with 50 ml. of 0.1 M Amberlite LA-2 in n-paraffin to extract the nitrate until a nitrate/uranium-plutonium mole ratio of 0.09 was obtained. The mixed urania-plutonia sol was quite stable and showed no signs of thixotropy.

A plutonia sol formed by amine extraction of a plutonium (IV) nitrate solution was prepared for comparison experiments. Also a plutonia sol prepared by precipitation-peptization techniques was prepared. Each of these plutonia sols was mixed with the crystalline nitrate-stabilized uranium (IV) sol. The mixed sol prepared from the amine extracted plutonium (IV) sol was contacted with 50 ml. of 0.1 M amine in n-paraffin and it thickened. The mixed sol prepared from the precipitation-peptization plutonium (IV) sol gelled in less than 12 hours. These undesirable conditions demonstrate the superiority of the present mixed urania-plutonia sols when prepared from alcohol extracted plutonium (IV) sols and crystalline, nitrate-stabilized, uranium (IV) sols.

Five (5) ml. of the alcohol extracted mixed urania and plutonia sol was formed into calcined microspheres by the method described in Example I and and microspheres analyzed. The calcined urania-plutonia microspheres were crack-free and exhibited high density (92–98% theoretical density).

EXAMPLE III

A plutonium (IV) sol was prepared and concentrated as in Example II. Thirty-five (35) ml. of the sol was extracted with 500 ml. of water-saturated n-hexanol to obtain a 1.0 M plutonium (IV) sol with a nitrate/plutonium mole ratio of 0.61. Two (2) ml. of the sol was mixed with 8 ml. of a crystalline, nitrate-stabilized, tetravalent uranium sol (0.97 M uranium, 0.115 M nitrate, 0.47 M formate) which had been prepared by alcohol extraction (56 ml. of n-hexanol). The mixed sol was, without further treatment, formed into microspheres by the method described in Example I and dried in air for 16 hours at 24° C. and calcined under argon-4% hydrogen at 1150° C. for 8 hours. The urania-plutonia microspheres were dense and crack-free.

What is claimed is:

1. A method for preparing stable urania-plutonia sols having minimal oxidation-reduction between the tetravalent ionic species comprising the steps of contacting a plutonium nitrate solution with an immiscible alcohol to thereby extract nitrate and form a nitrate-stabilized polymeric tetravalent plutonium sol, mixing said tetravalent plutonium sol with a crystalline nitrate-stabilized tetravalent uranium sol and thereafter removing nitrate by solvent extraction.

2. The method of claim 1 wherein said plutonium nitrate solution is 0.13 M plutonium nitrate-0.12 M nitric acid.

3. The method of claim 1 wherein said immiscible alcohol is an aliphatic alcohol.

4. The method of claim 3 wherein said aliphatic alcohol is selected from the group consisting of n-butanol, n-hexanol, and 2-ethyl-1-hexanol.

5. The method of claim 1 wherein said nitrate-stabilized tetravalent polymeric plutonium tetravalent sol is prepared by contacting a 0.13 M plutonium nitrate-0.12 M nitric acid solution with n-hexanol, extracting said nitrate until the nitrate/plutonium mole ratio is about 3, converting the resulting solution to a sol by heating at about 100° C., cooling to a temperature of about 24° C., and re-extracting nitrate with n-hexanol until a nitrate/plutonium mole ratio is about 1.0.

6. The method of claim 1 wherein said crystalline nitrate stabilized tetravalent uranium sol has an average crystallite size of about 40 angstroms.

7. The method of claim 1 wherein said stable mixed urania-plutonia sol has an average crystallite size of about 40 angstroms.

8. The method of claim 1 wherein said nitrate removal step is effected by contacting said mixed sol with 0.1 M n-lauryltrialkylmethyl amine in n-paraffin.

References Cited

UNITED STATES PATENTS 3,301,790   1/1967   Fitch et al. _____ 252—301.1

CARL D. QUARFORTH, Primary Examiner

R. L. TATE, Assistant Examiner

U.S. Cl. X.R.

23—344, 355